United States Patent Office 2,799,930
Patented July 23, 1957

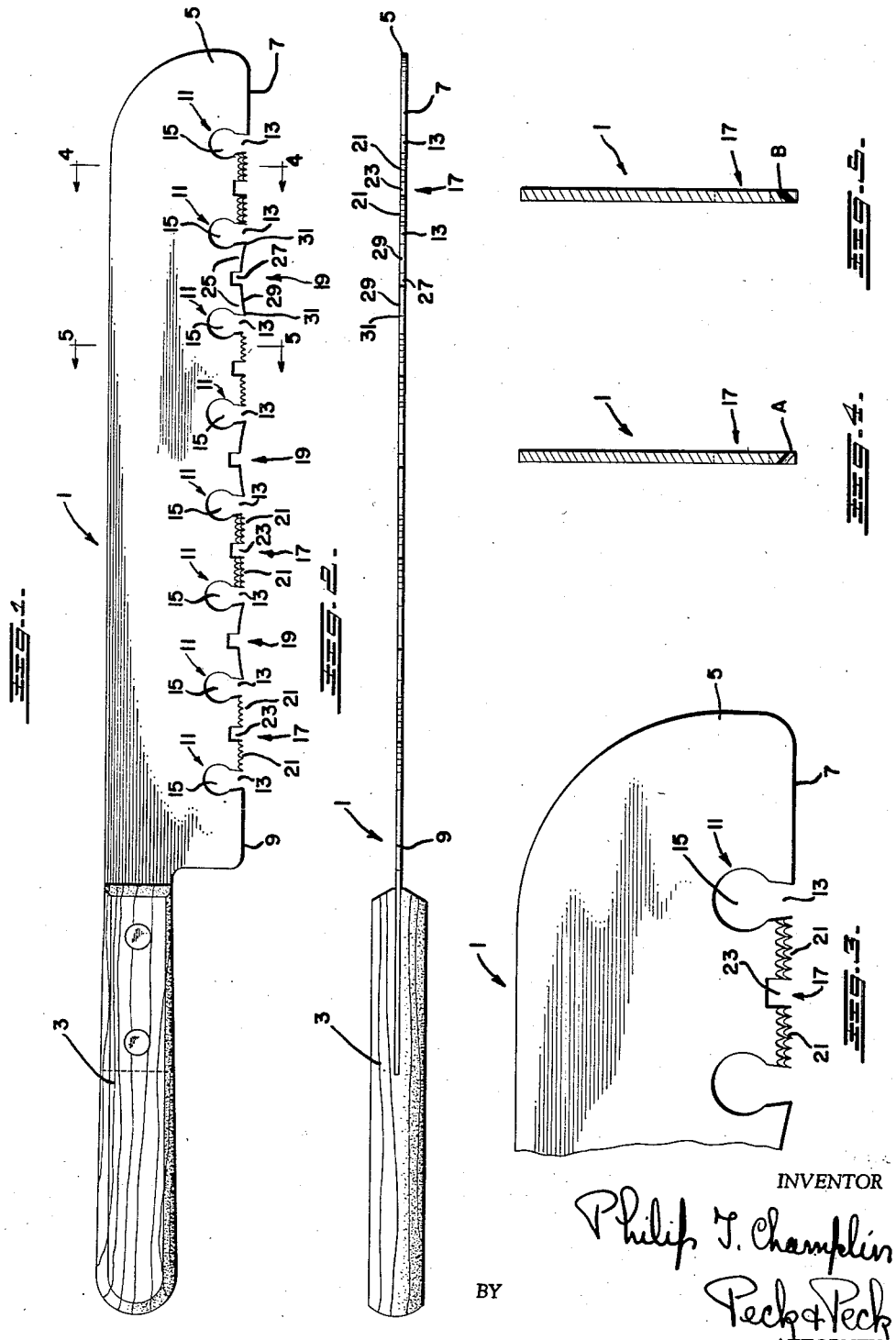

2,799,930

KNIFE

Philip T. Champlin, Little Valley, N. Y., assignor to Cattaraugus Cutlery Company, Little Valley, N. Y., a corporation of New York Application April 17, 1956, Serial No. 578,660

1 Claim. (Cl. 30—355)

This invention relates broadly to knives and in its more specific aspects it relates to a knife which has been specifically designed and adapted for cutting frozen foods; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

With the tremendous growth of sales and use of frozen foods there has arisen a need for a knife which will cut such frozen foods while in the solid state. As is well known foodstuffs when frozen are maintained in the frozen state until ready for use and when in such frozen condition present a hard, solid rock-like body which cannot be cut or penetrated by the ordinary knives of commerce.

There are many instances when it is desirable and/or necessary to cut a frozen food unit when it is frozen and in a solid rock-like condition. For instance, many frozen foods are packaged and contain enough food for several servings and if a fewer number of servings are wanted it is desirable to cut the package while frozen, use the desired amount while maintaining the remainder in its frozen state in a freezer. This cutting operation is not possible with many ordinary knives so that it is necessary either to prepare the whole food unit or to let it thaw and then cut it which is an undesirable practice in many instances for a considerable number of foods should not be re-frozen.

It will be recognized that certain problems are inherent in efficiently cutting a solid rock-like body such as a frozen food which are not present when non-frozen, soft or pliable foods are cut. As an example in cutting frozen food some provision should be made for accommodating the food which is actually cut by the knife for it will be appreciated that these food elements are hard and, unlike non-frozen food elements, may not be squeezed or otherwise accommodated by the rest of the frozen food body as the knife is reciprocated in the cutting operation. If such cut food elements are not provided for and removed from the slice they will load the cutting teeth and prevent the performance of a successful cutting operation.

A further characteristic of a successful frozen food cutting knife should involve the provision of means to ensure a clean cutting of the material by the teeth so that the cut material will be drawn free of the rest of the frozen body.

For obvious reasons it is desirable to produce a straight cut through the frozen food. Often this is difficult of achievement particularly on a hard body such as a frozen food. The knife of this invention embodies a unique structural arrangement whereby certain forces are generated during the cutting operation which tend to maintain the knife in a relatively true reciprocation course during the cutting operation.

I have evolved a knife for cutting frozen foods while in the frozen rock-like state which is efficient in its operation and ensures a clean cut while not requiring any substantial effort by the user. It has been one of my objects in devising this knife to provide an ingenious operative edge which not only provides cutting elements but also provides means for drawing out those elements from the slice which have actually been cut, and also provides means for drawing the cut material free. I have also so designed the cutting blades of my knife that the operator is added aided in making a straight cut.

I have achieved highly satisfactory results by providing a knife which has an operative edge formed with a series of uniquely designed and arranged cutting and carrier means each of which functions in a particular manner and co-acts with the other elements to produce a very successful cutting operation.

With the foregoing general objects, features and results in view, as well as certain others which will be apparent from the following explanation, the invention consists in certain novel features in design, construction, mounting and combination of elements, as will be more fully and particularly referred to and specified hereinafter.

Fig. 1 is a view of the knife in side elevation.

Fig. 2 is a bottom plan view of the knife particularly illustrating the operative edge of the knife.

Fig. 3 is an enlarged view of a part of the knife blade particularly illustrating one set of serrated cutting teeth and a carrier pocket.

Fig. 4 is a view taken on line 4—4 of Fig. 1.

Fig. 5 is a view taken on line 5—5 of Fig. 1.

In the accompanying drawings I have used the numeral 1 to designate in its entirety the knife blade which is attached in any convenient and suitable manner to a handle 3 which may be made of any desirable material. The blade 1 may be made of any conventional metals or alloys which endow the blade with a very limited degree of flexibility and sufficient strength to function as desired. At its forward end the blade is preferably formed with a blunt or curved nose 5 having a rearwardly extending preferably non-sharpened section 7. A similar preferably non-sharpened section 9 may also be provided at the rear lower edge of the blade.

The lower or operative longitudinal edge of the blade 1 is provided with a plurality of longitudinally spaced notches or carrier pockets which I have designated generally by the numeral 11, each such pocket having a mouth 13 cut through the edge of the blade which communicates with a generally circular recess 15 or main pocket portion. It will be noted that the carrier pockets extend from the rear end of section 7 to the forward end of section 9. This construction is preferable though not necessary and the end carrier pockets of the series of carrier pockets may be spaced from sections 7 and 9 and the construction will fall within the spirit and scope of my invention.

As I have stated the carrier pockets 11 are longitudinally spaced along the operative edge of the blade 1 and in the areas between the pockets I provide pairs of cutting teeth designated generally by the numeral 17 and pairs of wiper or cutting blades designated generally by the numeral 19, the cutting teeth and the wiper blades being alternately positioned, that is a pair of cutting teeth is provided, then a pair of wiper blades, then a pair of cutting teeth and so on. The cutting teeth are preferably provided adjacent each end carrier pocket.

Each pair of cutting teeth 17 provides two serrated cutting edges 21 separated by what I shall term a tooth carrier pocket 23 which is notched inwardly from the operative edge of blade 1. Consideration of the drawings indicates that the serrations forming the serrated cutting edges are cut from a side of the operative edge of the blade 1, and the side from which said serrations are cut are alternated, thus next adjacent pairs of cutting teeth 17 have their serrations cut from opposite sides of the edge of blade 1 as is clearly illustrated at A and B in Figs. 4 and 5, respectively. The serrations are cut transversely of the blade edge and provide sharp cutting elements.

Each pair of wiper blades 19 consists of two wiper blades 25 separated by a blade carrier pocket 27 which is notched inwardly from the operative edge of blade 1. Each wiper blade is of generally plow shape extending at a downward inclination to a point 31 from pocket 27, and the edges 29 of the wiper blades are sharpened. The points 31 of the wiper blades are in a plane slightly above the lower edges of the serrated teeth so that in the cutting operation the serrated teeth will initiate and perform the major part of the cutting while the wiper blades will function to wipe or shear off any of the material which may not be cleanly and completely cut off from the main body of the material by the serrated teeth.

The knife which I have devised may be provided with either a greater or lesser number of serrated teeth, wiper blades and carrier pockets than in the example illustrated and still fall within the spirit and scope of my invention. The number of the various elements will depend upon the use to which the knife is put.

In use the operator places the knife on the frozen food to be cut and exerts a downward pressure thereon while causing the knife to reciprocate over and through the body of frozen food. It will be understood that my knife will not only cut through the solid rock-like frozen food body but will also cut through the cardboard or the like carton in which it may be packaged. As the reciprocatory action of the knife continues the serrated teeth cut into the food and the wiper blades which are provided with very sharp edges draw the cut material free while the carrier pockets carry or draw out the slice that is actually cut by the knife and prevent the loading of the serrated teeth. The teeth and blade carrier pockets 23 and 27, respectively, also function in a generally similar manner. The operator of the knife is aided in making a straight cut by the arrangement of the serrated teeth wherein one pair is cut from one side of the operative edge of the blade while the teeth of the next adjacent pair are cut from the other side.

It will now be recognized that I have provided a knife for cutting frozen foods and the like solid rock-like bodies, which is formed with an operative edge having a series of different types of cutting and carrier elements each of which functions to provide a knife which is efficient and true in its cutting operation.

I claim:

A knife adapted to be reciprocated through the material being cut, said knife including a blade having a plurality of cutting elements and a plurality of wiper elements alternately positioned along the blade, each of said cutting elements comprising a series of serrated teeth having a notch formed in the blade substantially intermediate the ends of the series of serrated teeth to divide each cutting element into two series of serrated teeth, the notch forming a carrier pocket for carrying cut material, and each of said wiper elements having a curved sharpened edge, the ends of said edge being pointed and in a plane slightly above the ends of the serrated teeth, said sharpened edge having a notch formed therein intermediate the ends of the sharpened edge to divide each wiper element into two spaced apart sharpened edges, the notch in each wiper element forming a carrier for cut material, and each cutting element and wiper element being spaced apart by a further notch formed in the blade and the further notches being of greater dimensions than the notches in said cutting and wiping elements.

References Cited in the file of this patent

UNITED STATES PATENTS

| | | |
|---|---|---|
| 2,059,414 | Taylor | Nov. 3, 1936 |
| 2,552,652 | Stasiek | May 15, 1951 |
| 2,685,131 | Seeberger | Aug. 3, 1954 |
| 2,750,669 | Hohmann | June 19, 1956 |

FOREIGN PATENTS

| | | |
|---|---|---|
| 251,184 | Great Britain | Apr. 29, 1926 |